United States Patent Office 2,858,297
Patented Oct. 28, 1958

2,858,297

VINYL SULFIDES OF SUBSTITUTED UREAS AND THIOUREAS, POLYMERS THEREOF, AND METHODS FOR MAKING THEM

Sidney Melamed, Philadelphia, Pa., assignor to Rohm & Haas Company, Philadelphia, Pa., a corporation of Delaware No Drawing. Application July 15, 1955
Serial No. 522,397

20 Claims. (Cl. 260—77.5)

This invention is concerned with ureido- and thioureido-vinyl sulfides, polymers thereof and with the methods for making the monomers and the polymers. It is particularly concerned with monoethylenically unsaturated compounds of this type which are free of ether groups that are sensitive to dilute aqueous mineral acids and polymers which are stable to acid, a property adapting them to a wide variety of uses, including employment under acid conditions.

The monomeric compounds of the present invention have the structure of one of the general Formulas I, II, III, and IV:

(I)       $CH_2=CHS\phi(NHCX)_nNR'R^2$ (II)       $CH_2=CHSANR^3CXNR'R^2$ (III)       $(CH_2=CHS\phi NHCXNH)_mR^4$ (IV)       $(CH_2=CHSANR^3CXNH)_mR^4$ where $\phi$ is selected from the group consisting of o-phenylene, p-phenylene and said phenylene groups substituted by 1 to 2 alkyl groups having 1 to 4 carbon atoms, X is selected from the group consisting of oxygen and sulfur, $n$ is an integer having a value of 1 except that, when X is oxygen and both R' and $R^2$ are hydrogen, $n$ is 2, R', when not directly connected to $R^2$, is selected from the group consisting of hydrogen, phenyl, and alkyl groups having from 1 to 18 carbon atoms, $R^2$, when not directly connected to R', is selected from the group consisting of hydrogen, methyl and ethyl, R' and $R^2$, when directly connected together, are selected from the group consisting of the morpholino residue $=(CH_2CH_2)_2O$, the piperidino residue $$—(CH_2)_5—$$

and the pyrrolidino residue $—(CH_2)_4—$,

A is an alkylene group having 2 to 6 carbon atoms, at least two of which extend in a chain between the adjoining S and N atoms, $R^3$ is selected from the group consisting of hydrogen and alkyl groups having 1 to 4 carbon atoms, $R^4$ is selected from the group consisting of phenylene, methylene - bis - phenylene, methylidyne-tris-phenylene, and alkylene groups having 4 to 10 carbon atoms, and $m$ is an integer having a value of of 2 to 3.

The compounds of Formula I, in which $n$ is 2, which are the vinylthiophenylbiurets such as 2-(vinylthio)-phenylbiuret, 4 - (vinylthio) - phenylbiuret, 3 - methyl-2-(vinylthio) - phenylbiuret, 5-methyl-2-(vinylthio)-phenyl biuret, 6-methyl-2-(vinylthio)-phenylbiuret, may be produced by reacting a compound of Formula V:

(V)       $CH_2=CHS\phi NH_2$ with an alkali metal cyanate, such as sodium, potassium, or lithium cyanate, and a mineral acid in which the three components are present in approximately equimolar quantities of each. The reaction may be effected in aqueous medium, or in an organic solvent medium, such as in a lower alcohol including methanol, ethanol, isopropanol, n-butanol or sec-butanol. If desired, this reaction may be carried out in one of these solvents under anhydrous or substantially anhydrous conditions or in a mixture of the organic solvent with water. The reaction may be performed at temperatures of 50° C. and is preferably carried out at 0° to 20° C. Since the reaction is exothermic, it may be desirable to cool the reaction vessel to control the temperature. Instead of cooling or in conjunction with cooling, the reaction temperature may be controlled additionally by the gradual addition of one of the reagents to a mixture of one of the other two. For example, the acid may be added gradually to the mixture of the other two. Such acids as hydrochloric, sulfuric, and phosphoric acids may be used. The time of reaction may vary from 2 to 24 hours. The product is isolated from the reaction medium by stripping (evaporation of solvent) at normal or reduced pressures and the product may be purified by recrystallization from such solvents as water.

Examples of compounds of Formula V which may be so reacted include the following:

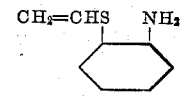
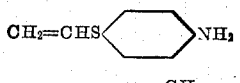
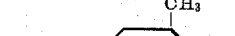
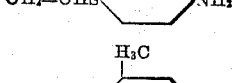
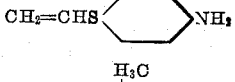
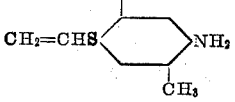

These aminophenyl vinyl sulfides may be obtained by the reaction of an aminophenyl mercaptan and acetylene in the presence of a basic catalyst. The reaction is generally carried out in the presence of a small amount (5% to 10%) of potassium hydroxide, potassium carbonate, sodium hydroxide, or the like as a catalyst. Acetylene is passed into the mercaptan usually in an inert organic solvent, such as benzene, toluene, or high boiling ether, at 120° to 180° C. under pressures of 200 to 500 lbs./sq. in. The vinyl sulfides thereby formed are separated by distilling under reduced pressure.

The compounds of Formula II, in which the terminal nitrogen is attached to two hydrogens (as R' and $R^2$), may be obtained by the reaction of a compound of formula VI:

(VI)       $CH_2=CHSANHR^3$       (1)

with an alkali metal cyanate and a mineral acid. Approximately equimolar quantities of each of the compounds of Formula VI, the cyanate or thiocyanate and the mineral acid may be employed. The solvent medium, temperature, time, and other conditions of the reaction, as well as the procedure for isolation, are essentially the same as in the reaction of the alkali metal cyanate with a compound of Formula V and a mineral acid described above.

Examples of aminoalkyl vinyl sulfides that may be employed as the compound of Formula VI include:

| | |
|---|---|
| CH$_2$=CHSCH$_2$CH$_2$NH$_2$ | (1) |
| CH$_2$=CHSCH$_2$CH$_2$CH$_2$NH$_2$ | (1) |
| CH$_2$=CHSCH(CH$_3$)CH$_2$NH$_2$ | (1) |
| CH$_2$=CHSCH$_2$CH(CH$_3$)NH$_2$ | (1) |
| CH$_2$=CHSCH$_2$CH$_2$NHCH$_3$ | (2) |
| CH$_2$=CHSCH$_2$CH$_2$NHC$_4$H$_9$ | (2) |
| CH$_2$=CHSCH$_2$C(CH$_3$)$_2$NH$_2$ | (2) |

These compounds of Formula VI may be made by various procedures. The first four compounds followed by the numeral (1) are more readily prepared by reacting the corresponding aminoalkyl mercaptan with acetylene in the presence of a basic catalyst, such as potassium hydroxide, sodium hydroxide or the alkali metal carbonates. For example, the reaction may be carried out in the presence of a small amount (5% to 10%) of one of these alkalies. Acetylene is passed into the reaction medium containing the aminoalkyl mercaptan and the alkali, usually comprising an inert organic solvent, such as benzene, toluene, or high boiling ether, at 120° to 180° C. under pressures of 200 to 500 lbs./sq. in. The vinyl sulfides which are thus formed are separated under reduced pressure. The last three of the specific compounds listed immediately hereinabove followed by the numeral (2) are best made by reacting acetylene with an aminoalkyl-isothiuronium salt of the general Formula VII:

(VII) 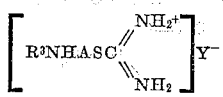

where the symbols are the same as above, except Y is a negative anion, such as chloride, bromide, sulfate, and so on. The reaction is carried out under conditions substantially the same as those just described in respect to the reaction of the aminoalkyl mercaptans with acetylene, and more particularly described in application Serial No. 522,398, filed on even date herewith, now Patent No. 2,806,840 in the hands of a common assignee. These isothiuronium salts are obtained by the reaction in an alcohol, such as ethanol, at reflux (60° to 80° C.) of a mixture of approximately equimolar amounts of thiourea and a corresponding chloride, bromide, or the like having the Formula VIIa:

(VIIa)      R$^3$NHAY

The product crystallizes out of the reaction mixture either while hot or on cooling.

The compounds of Formula II in which R' and R$^2$ are both hydrogen may also be made by the fusion of urea or thiourea with the compound of Formula VI above at a temperature of 90° C. to 180° C. Approximately equimolar quantities of the reactants are employed and the reaction may be carried out over a period of one to eight hours. The product obtained is essentially the compound desired but it may be purified if necessary by recrystallization from water.

To produce compounds of Formula I in which n is 1 and also to produce compounds of Formula II, a compound of Formula V or of Formula VI above is reacted with an alkyl or phenyl isocyanate or isothiocyanate having the general Formula VIII:

(VIII)      R'NCX

This reaction is effected in an inert solvent, such as benzene, toluene, xylenes, petroleum ether, naphthas, ether, dioxane and the like. The temperature may be 0° to 40° C. Since it is an exothermic reaction cooling may be employed for controlling the temperature of the reaction. Generally it is desirable to add one reactant to the other; for example, the isocyanate or isothiocyanate may be added gradually to the amine. In general, the amount of the compound of Formula VIII should be approximately molarly equivalent to the quantity of the reactant of Formula V or Formula VI. If desired, however, a small excess of the amine of Formula V or VI may be employed. The time of reaction may vary from ½ to 6 hours, depending on conditions. The product of Formula I or Formula II may be isolated from the reaction medium by stripping off solvent and subsequently distilling the product of Formulas I or II at low pressure (e. g., 2 mm. of mercury or less). Instead of distilling the product, it may be recrystallized from water, alcohol, ethyl acetate or other solvent. Alternatively, in some cases, the isolation may be effected by evaporating part of the solvent and then cooling to crystallize out the product of Formula I or II. The organic isocyanates that may be employed include phenyl isocyanate, chlorophenyl isocyanate, benzyl isocyanate, naphthyl isocyanate, cyclohexyl isocyanate, methyl isocyanate, ethyl isocyanate, propyl isocyanate, isopropyl isocyanate, butyl isocyanate, isobutyl isocyanate, t-butyl isocyanate, amyl isocyanate, isoamyl isocyanate, hexyl isocyanate, octyl isocyanate, decyl isocyanate, dodecyl isocyanate, hexadecyl isocyanate, and oleyl isocyanate and phenyl isothiocyanate, chlorophenyl isothiocyanate, benzyl isothiocyanate, methyl isothiocyanate, ethyl isothiocyanate, propyl isothiocyanate, isopropyl isothiocyanate, butyl isothiocyanate, isobutyl isothiocyanate, t-butyl isothiocyanate, amyl isothiocyanate, isoamyl isothiocyanate, hexyl isothiocyanate, octyl isothiocyanate, decyl isothiocyanate, dodecyl isothiocyanate, hexadecyl isothiocyanate.

Compounds of Formulas I and II in which the terminal nitrogen contains substituents R' and R$^2$ which are both other than hydrogen may be obtained by reacting a compound of Formula V or Formula VI, such as the specific examples mentioned hereinabove with a compound of Formula IX:

(IX)      R'R$^2$NCXY' where Y' is a halogen and R' and R$^2$ are either the cycle-forming residues of morpholine, piperidine, pyrrolidine, or the individual substituents other than hydrogen listed above under the definition of the compounds of Formulas I, II, III, and IV. Examples of the compounds of Formula IX include dimethylcarbamyl chloride, diethylcarbamyl chloride, methylethylcarbamyl chloride, the corresponding thiocarbamyl chlorides and the chlorocarbamates or chlorothiocarbamates derived from morpholine, piperidine, and pyrrolidine. Molar equivalent quantities of the compound of Formula IX and of the compound of one of Formulas V and VI may be employed in the presence of a molar equivalent of an inorganic base or in the presence of a molar excess of the amine of Formula V or VI or another amine, such as a t-amine including triethylamine, pyridine, and the like, for accepting the hydrogen chloride developed in the reaction. When an inorganic base acceptor is used, such as sodium carbonate, potassium carbonate, or the like, the reaction is preferably carried out in a medium comprising a mixture of water and an organic solvent, such as ether or benzene. On the other hand, if an amine is used as the acceptor for the hydrogen chloride, the reaction is preferably carried out under substantially anhydrous conditions in organic solvents, such as ether or benzene. On the other hand, if an amine is used as the acceptor for the hydrogen chloride, the reaction is preferably carried out under substantially anhydrous conditions in organic solvents such as ether, benzene, chloroform, or carbon tetrachloride. In the presence of an amine acceptor, the temperature may vary from 0° to 80° C. but the reaction is preferably carried out in the colder portion of this range, such as from 0° to 25° C. In the presence of an inorganic base acceptor, the reaction may be carried out in the temperature range of 0° to 80° C. but it is preferred to carry the reaction out at temperatures of 25° to 80° C. In either system, cooling may be resorted to to control the temperature, and the chloride may be gradually added to the mixtures of other materials to assist in the control of the temperature. The reaction proceeds rapidly, substantially as rapidly as the addition is made, and the time employed for such addition may vary, such as from one hour to 12 hours, depending upon the amount of product desired and the facilities available for cooling which influence the rate of addition. The product is isolated by stripping off the solvent and subsequently distilling the product under a vacuum, such as at a pressure of 2 mm. Hg or less.

The compounds of Formulas III and IV may be made by reacting a compound of one of Formulas V and VI with a diisocyanate or a diisothiocyanate of Formula X:

(X) 

Examples of the compounds of Formula X that may be employed include tetramethylene diisocyanate and diisothiocyanate, hexamethylene diisocyanate and diisothiocyanate, decamethylene diisocyanate and diisothiocyanate, tolylene diisocyanate and diisothiocyanate, dianisidine diisocyanate, methylene-bis (phenyleneisocyanate) and isothiocyanate, and methylidyne-tris (phenyleneisocyanate).

The reaction is carried out in the solvents and under the conditions of temperature and time stated above in the description of the reaction of a compound of Formula V or Formula VI with a compound of Formula VIII. The only difference is that in the reaction with the polyisocyanate or polyisothiocyanate, two to three moles of the amine of Formula V or VI is used for each mole of the compound of Formula VIII. Isolation is carried out in the same manner as described hereinabove in the reaction of the isocyanates or isothiocyanates of Formula VIII.

The compounds of Formulas I, II, III, and IV are generally high boiling liquids or solids of non-hygroscopic character. They have various solubilities. All are soluble in various organic solvents and many are soluble in water. The solubility is a function of the degree of substitution—the less substitution, the more likely that the compounds will be water-soluble. Also, the less the substitution, the more likely the compounds will be solids. All the compounds of Formulas I, II, III, and IV are generally stable under normal conditions of storage. They are characterized by reactivity by addition at the point of vinyl unsaturation and also by reactivity with aldehydes at the hydrogen atoms carried on the nitrogen atoms of the ureido groups. The vinyl sulfide derivatives of the present invention are quite distinct from the analogous vinyl ether compounds. One of the surprising differences is the fact that all of the compounds of Formula II and of Formula IV herein can be obtained even though the radical A may contain only two carbon atoms. In contrast with this, the reaction of a carbamyl chloride with aminoethyl vinyl ether and numerous related vinyl ethers results in a complete loss of the vinyl unsaturation apparently by cyclization. Another unexpected feature is the ability of aminophenyl mercaptans to be vinylated on the sulfur atom whereas in aminophenolic compounds the acetylene goes into the ring instead of on the oxygen atom. Furthermore, the reactions of the vinyl sulfides of the present invention are quite distinctive from the reactions of the analogous vinyl ethers. The vinyl sulfides of the present invention are readily homopolymerized with free radical catalysts, generally including not only the azo catalysts which are effective in the homopolymerization of analogous vinyl ethers but also by such free radical initiators or catalysts as the peroxides, such as benzoyl peroxide, lauroyl peroxide, and so on. Furthermore, the vinyl sulfides of the present invention are more readily copolymerized with other types of monomers than are the corresponding ureido vinyl ethers. The copolymers obtained from the vinyl sulfides of the present invention, therefore, have compositions which closely approximate the composition of the monomers as charged over a wide range of ratios between the several monomers and especially from ratios of 10:90 to 90:10. Copolymers obtained from the ureido vinyl ethers of analogous structure are generally substantially lower in the vinyl ether content than the initial charge. An outstanding characteristic of the copolymers containing the vinyl sulfides of the present invention is the fact that those containing units of comonomers that tend to undergo thermal degradation, such as methyl methacrylate, obtain a remarkable protection from such degradation by virtue of the presence of an appreciable proportion of the vinyl sulfide monomer units of the present invention. As compared to the analogous vinyl ethers, the vinyl sulfides of the present invention are less sensitive to acid and, hence, they are able to be copolymerized with such monoethylenically unsaturated acids as acrylic acid, methacrylic acid, maleic acid, itaconic acid and so on, without being hydrolyzed at the sulfide linkage as would occur when attempts are made to copolymerize such acid monomers with analogous vinyl ethers. The vinyl sulfides of the present invention add mercaptans in the β-position thereby producing stable sulfides. In contrast, analogous vinyl ethers add mercaptans in the α-position producing unstable adducts. By virtue of this character of the vinyl sulfides of the present invention, they can be used to react with mercaptans and to modify sulfur-containing or mercaptan-containing compounds, such as wool and the like. The vinyl sulfides of the present invention may be oxidized to produce stable sulfoxides and sulfones. By conversion of the sulfides to sulfoxides or sulfones, the monomers of the present invention are polymerizable by anionic or base catalysts, such as sodamide, potassamide and lithium alkyl.

The compounds of Formulas I, II, III, and IV are all polymerizable to form homopolymers in the presence of free radical catalysts or initiators. This homopolymerization may be carried out in bulk, solution, emulsion, or suspension procedures under neutral or slightly alkaline conditions. Generally, a temperature of 50° to 100° C. and a time of 2 to 24 hours is employed. From 0.5 to 10% by weight of the catalyst may be used based on the weight of monomer or total weight of monomers. In the solution procedure, it is preferred to have the monomer in a concentration of at least 50% by weight. In the emulsion or suspension procedures, an emulsifier may be employed, preferably of non-ionic type. Homopolymers may be obtained having molecular weights of 10,000 to 20,000 or more by any of these procedures.

The compounds of Formulas I, II, III, and IV may also be copolymerized with other monoethylenically unsaturated polymerizable compounds in the presence of free radical initiators or catalysts. In both homopolymerization and copolymerization, organic peroxides, such as butyl perbenzoate, or benzoyl peroxide, are suitable for polymerization in bulk or in solution, while ammonium or potassium persulfate or the like are useful in the polymerization of emulsions or dispersions. Typical azo catalysts are azodiisobutyronitrile, azodiisobutyramide, dimethyl (or diethyl or dibutyl) azodiisobutyrate, azobis (α,γ-dimethyl - valeronitrile), azobis (α-methylbutyronitrile), azobis (α-methylvaleronitrile), dimethyl azobismethylvalerate, and the like.

As useful unsaturated compounds for forming the copolymers there may be used acrylic acid, methacrylic acid, esters of acrylic acid or methacrylic acid and monohydric alcohols such as methyl, ethyl, butyl, octyl, dodecyl, cyclohexyl, allyl, methallyl, undecenyl, cyanoethyl, dimethylaminoethyl, and the like; esters of itaconic acid and similar alcohols; esters from maleic, fumaric or citraconic acids, and likewise similar alcohols; vinyl esters of carboxylic acids such as acetic, propionic, butyric, and the like; vinyloxyalkyl esters such as vinyloxyethyl acetate, etc.; vinyl ethers such as ethyl vinyl ether, butyl vinyl ether, octyl vinyl ether, allyl vinyl ether, hydroxyethyl vinyl ether, aminoethyl vinyl ether, aminopropyl vinyl ether, dimethylaminoethyl vinyl ether, vinyloxyethoxyethanol, vinyloxypropoxyethanol; methacrylonitrile or acrylonitrile; acrylamide, or methacrylamide, and N-substituted amides of these types; vinyl chloride, vinyl bromide, vinylidene chloride, 1-chloro-1-fluoroethylene, or ethylene; 1-acetoxy-1,3-butadiene; styrene, or divinylbenzene; ethylene diacrylate or dimethacrylate, bis(vinoxyethyl)urea, vinoxyethyl acrylate, vinoxypropyl acrylate, etc. Where two polymerizable vinylidene groups occur in the same molecule, as in compounds toward the end of the above list, cross-linking results where more than one to two percent thereof is used in forming the copolymer.

The compounds of the present invention may also be polymerized by acid catalysts, such as sulfur dioxide, boron trifluoride, $SnCL_4$ and $ALCL_3$. When sulfur dioxide is used, it is used in excess as a solvent and the polymers formed may contain $SO_2$ as a component. When boron trifluoride is used as the catalyst for polymerization, it is generally used in proportion slightly in excess of one mole of $BF_3$ per mole of the vinyl compound of the present invention.

Besides polymerizing the compounds by addition polymerization procedures, the compounds of the present invention which contain at least two hydrogen atoms on the two nitrogens of the ureido or thioureido groups react whith formaldehyde under alkaline conditions to produce methylolated derivatives. This reaction may be effected either on the nonomers or on homopolymers or copolymers of the compounds of the present invention. The methylolated derivatives of the monomers and copolymers may be further condensed to form methylene-bis-compounds in the presence of acid. This reaction converts polymers to insoluble and infusible condition.

The monomeric compounds of the present invention are fungicides, corrosion-inhibitors, and oxidation-inhibitors. For the first purpose, they may be compounded in a proportion of 0.1% to 5% or more by weight in a high flash naphtha and sprayed upon the foliage or other parts of plants desired to be protected from fungal attack. The compounds of the present invention may be incorporated in amounts of about 0.1% to 2% or more by weight in aqueous systems, such as automobile cooling systems, for reducing the corrosion exerted by such systems on the metals of the system. For this purpose, they may be incorporated in simple aqueous media or in aqueous solutions of glycols or alcohols used in such cooling systems. They may also be incorporated as refrigerants and in hydraulic liquids to protect the mechanism of the refrigerators or hydraulic mechanisms, such as lifts or brakes, from corrosion. The monomers may be applied to wool either from aqueous or alcoholic solutions and heated during and subsequent to the drying to effect reaction of the monomers with the mercaptan groups of the wool and, if desired, the treated wool may then be subjected to polymerization conditions in the presence of formaldehyde, an acid catalyst, and heat to impart a modified hand, stiffness and reduced shrinkage to the wool or wool fabric. The monomers may be methylolated by formaldehyde on the alkaline side and applied to textiles, especially of the cellulosic or glass fiber types and heated thereon to provide anchoring sites for further reaction with subsequently applied materials. In the case of long-chain substituted methylolated compounds of the present invention, such treatment modifies the water-sensitivity and generally imparts water-repellency to the textiles and other materials treated.

The homopolymers are useful in coatings, as components of adhesives for the repellent treatment of porous substrates, such as textiles, leather, wood, cellophane, and for the fungistatic protection thereof. In adhesives, they serve as tackifiers, particularly in pressure-sensitive adhesive tapes and especially in rubber compositions.

Polymers of the compounds of Formulas I, II, III, and IV, including homopolymers and copolymers as well as the methylolated polymers, are useful as dope additives, as in the spinning of cellulose acetate, cellulose acetate butyrate, and the like. They are also useful for imparting wet strength to paper by the addition to the pulp as in the beater or by spraying an organic solvent solution thereof on the finished sheet. They may also be applied to woolen and cellulosic fabrics to reduce shrinkage thereof on washing or laundering.

Both the homopolymers and the copolymers are adapted to be thermoset or converted to an insoluble and infusible condition by heating, especially when in the presence of formaldehyde or when methylolated polymers are employed. When copolymers of the compounds of the present invention with comonomers having a tendency to degrade on heating are employed for this purpose, the presence of the vinyl sulfide units of the present invention protects the comonomeric units from thermal degradation or raises considerably the point of thermal degradation thereof so that higher temperatures may be employed in the heat-conversion stage. This is an especially valuable characteristic of the copolymers of the monomers of the present invention with methyl methacrylate and other methacrylates which have this tendency to decompose on heating.

The polymers including both homopolymers and copolymers are valuable for the production of moldings, castings, coatings, and the formation of formed articles, such as sheets, rods, tubes, films, and the like or enamels for metals, ceramics, glass and the like. The polymers may be applied in the form of substantially linear polymers and then after application and during or subsequent to the drying thereof, particularly in coatings, the molded or cast articles may be heated to render them insoluble and infusible.

In the following examples which are illustrative of the invention, the parts given are by weight unless otherwise indicated:

*Example 1*

A mixture of 50 ml. of water, 20.6 grams of 2-aminoethyl vinyl sulfide, and 18 grams of potassium cyanate is cooled to 0° to 5° C., stirred and treated dropwise with 17 ml. of conc. (37%) hydrochloric acid diluted with 30 ml. of water. The mixture is allowed to stir at 25° C. for one hour and then concentrated at reduced pressure. The organic material is extracted from the salt with methanol and isolated by evaporation of the methanol. The product is recrystallized from water and is extracted with hot toluene. The toluene solution on cooling gives 2-ureidoethyl vinyl sulfide as white crystals of a M. P. 79° to 80° C., containing by analysis 39.17% C; 6.18% H; 18.40% N; and 21.00% S; the calculated values are 41.1% C; 6.85% H; 19.2% N; and 21.9% S.

*Example 2*

A mixture of 23 grams of 2-(N-methylamino)ethyl vinyl sulfide, 20.2 grams of potassium cyanate, and 100 ml. of methanol is stirred at 10° to 15° C. and treated over a period of one hour, with 19.1 ml. of conc. (37%) hydrochloric acid diluted with 100 ml. of methanol. The solution is filtered and the methanol removed at reduced pressure. The residue is recrystallized from water to give 30.3 grams (theor. yield—31.4) of white, crystalline product, M. P. 110° to 115° C. Further purification by recrystallization from 200 ml. of ethyl acetate gives 26 grams of the product, N-methyl-N-2-(vinylthio)ethylurea, having a M. P. of 113.5 to 115° C. and containing by analysis 45.33% C; 7.58% H; 17.47% N and 20.5% S; the calculated values are 45.5% C; 7.5% H; 17.5% N and 20.0% S. The product is also soluble in hot toluene.

*Example 3*

A solution of 14.2 grams of ethyl isocyanate in 50 ml.

benzene is added slowly to 23.4 grams of 2-(N-methylamino)ethyl vinyl sulfide in 50 ml. of benzene with stirring at 5° to 10° C. The mixture is allowed to stir an additional 30 minutes and the benzene removed at reduced pressure to give 34 grams of residue. The residue is purified by distillation and the fraction boiling at 170° to 177° C./0.3 mm. Hg amounts to 30 grams of a light-yellow oil containing by analysis 50.73% C; 8.52% H; 14.9% N; and 17.0% S. This corresponds to N-ethyl-N'-methyl-N'-2-(vinylthio)ethylurea for which the calculated values are 51.1% C; 8.52% H; 14.9% N and 17.0% S. The product is insoluble in water and octane but soluble in acetone and methanol.

Example 4

A solution of 10 grams of the product of Example 3, 10 grams of dimethylformamide and 0.1 gram of dimethyl azodiisobutyrate is heated for 16 hours at 75° C. in the presence of a nitrogen atmosphere. The resultant polymer is isolated by precipitation with acetone as a light-yellow solid softening at 65° to 80° C.

It is useful as a modifier for the cellulose acetate. For this purpose, it is added to the cellulose acetate spinning solution in acetone in amounts of 2 to 10% on the weight of the acetate. Fibers and films spun from this solution are more readily dyed by direct dyes such as those suitable for cotton fabrics than ordinary cellulose acetate fibers and films.

Example 5

A solution of 17.4 grams of the product of Example 3, 90 grams of methyl methacrylate, 161 grams of ethoxyethyl acetate and 0.54 gram of azobisisobutyronitrile is heated at 80° C. for eight hours. The resultant solution has a Gardner-Holdt viscosity of Z3+. One portion (10 grams) is treated with methanol and the precipitate dried. It contains by analysis 2.39% N corresponding closely to 2.62% N calculated for a copolymer containing 10 mole percent of N-ethyl-N'-methyl-N'-2-(vinylthio)ethylurea and 90 mole percent of methyl methacrylate.

The remainder of the solution (258 grams) is introduced with 90 parts of titanium dioxide and an additional 30 parts of ethoxyethyl acetate into a shear mixer of Werner-Pfleiderer type. After being thoroughly mixed, the pigmented mass is applied to metal panels by brushing. The treated panels are baked at 400° F. for ten minutes producing a glossy, hard white surface. The copolymer may be admixed with other materials such as ureaformaldehyde-butanol condensates and acids such as butyl acid phthalate and again pigmented and baked to give resistant, hard, adhesive and thermoset coatings on metal, glass, ceramics or other substrates.

Example 6

A mixture of 1.74 grams of the product of Example 3 and 99 grams of methyl methacrylate containing 0.22 part of benzoyl peroxide is cast between glass plates to give a clear, colorless polymer sheet. This polymer sheet on being heated to 200° C. for several hours shows only slight loss in weight compared to a similar sheet of a homopolymer of methyl methacrylate.

Example 7

A copolymer of 90 parts of acrylonitrile and 10 parts of the product of Example 3 dissolved in dimethylformamide and spun into fiber and stretch-orientated in the usual manner gives a material which is much more readily dyeable than a homopolymer of acrylonitrile and shows much less degradation upon exposure in a weatherometer.

Example 8

A mixture of 61 grams (0.4 mole) of 2-aminophenyl vinyl sulfide, 80 ml. of methanol and 38.9 grams (0.48 mole) potassium cyanate is stirred and treated dropwise at 30° C. with 43 ml. (0.44 mole) of concentrated hydrochloric acid in 70 ml. of methanol. The addition is completed in two hours and the mixture is allowed to stir at room temperature for 16 hours. The reaction mixture is concentrated at reduced pressure, extracted with methanol and filtered to remove salt. The filtrate is concentrated again and the residue recrystallized from water to give 16 grams of 2-(vinylthio)phenylbiuret as a white, crystalline product, M. P. 177° to 178°, containing 17.7% N and 13.5% S which agree with the values calculated for

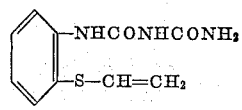

The product is soluble in methanol, acetone and dimethylformamide and has an ebulliometric molecular weight of 244, calculated 237.

Example 9

A solution of 24 grams of ethyl isocyanate in 100 ml. of ether is added to a solution of 51 grams of 2-aminophenyl vinyl sulfide in 100 ml. of ether in a period of 30 minutes at 5° to 10° C. The solution is stirred an additional hour; the volume is reduced to half by stripping, and the mixture is cooled to 0° C. The product, N-ethyl-N'-2-(vinylthio)phenylurea, separates as a white, crystalline solid and is isolated by filtration. It has a M. P. of 114° C. on recrystallization from ethanol as white needles.

Example 10

A mixture of 11.7 grams of 3-aminopropyl vinyl sulfide, 10.6 grams of sodium carbonate, 25 ml. of water and 50 ml. benzene is stirred at 40° C. and treated slowly with 11.0 grams of dimethylcarbamyl chloride in 50 ml. of benzene. The mixture is allowed to stir at 45° to 50° C. for two hours; the layers are separated and the benzene layer washed with water. The benzene solution is dried and concentrated and the residue distilled to give 14 grams of product, N-vinylthiopropyl-N',N'-dimethylurea, $CH_2=CHS(CH_2)_3NHCON(CH_3)_2$ as a light-yellow oil insoluble in water and readily soluble in alcohol, acetone and toluene. The product contains 14.6% N and 17.1% S; the calculated values are 14.8% N and 16.9% S.

Example 11

(a) By the procedure of Example 10 there is condensed 24 grams of N-methylaminoethyl vinyl sulfide and 32 grams of the carbamyl chloride derived from morpholine in the presence of 28 grams of potassium carbonate. The product,

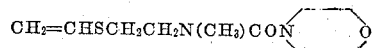

is isolated as a high-boiling oil, soluble in organic solvents and insoluble in water.

(b) Ten grams of the product of part (a) hereof and 0.2 gram of dimethyl azodiisobutyrate are mixed and heated in an inert atmosphere at 75° C. for 12 hours. A glass-like polymer is produced useful as a coating material for textiles, leather, wood and ceramic articles.

(c) A copolymer of 99 parts of methyl methacrylate and 1 part of the product obtained in part (a) hereof is prepared as a cast sheet in the presence of benzoyl peroxide as initiator. The resultant sheet shows improved resistance to thermal degradation as compared to a polymer of methyl methacrylate alone.

(d) A mixture of 90 parts of acrylonitrile and ten parts of the monomer of part (a) hereof is emulsified with 2 parts of a condensate of 20 to 40 moles of ethylene oxide and octylphenol in 150 parts of water. Polymerization is effected with 0.5 part ammonium persulfate and 0.2 part of sodium hydrosulfite. The resultant copolymer is readily formed into fibers by standard spinning techniques and after stretching shows high tensile strength with improved dyeability and resistance to ageing as measured in a weatherometer.

*Example 12*

(a) A solution of 27 grams of phenyl isocyanate in 50 ml. of benzene is added to 21 grams of 2-aminomethyl vinyl sulfide in 50 ml. of benzene with stirring and cooling. The product is isolated by evaporation of the solvent to give an almost quantitative yield of yellow solid, $CH_2=CHSCH_2CH_2NHCSNHC_6H_5$. The product may be purified by recrystallization from ethanol or ethyl acetate. It contains both sulfur and nitrogen; the calculated values are 11.8% N and 26.9% S.

The product is useful as a fungicide controlling both *Monilinia fructicola* and *Stemphylium sarcinaeforme* organisms.

(b) By the same procedure 17.1 grams of t-octyl isothiocyanate and 11.7 grams of N-methylaminoethyl vinyl sulfide gives the corresponding thiourea, $$CH_2=CHS-CH_2CH_2N(CH_3)CSNHC_8H_{17}-t$$

This product is also useful as a fungicide and is readily soluble in high-flash naphtha solvents suitable for agricultural use.

(c) A mixture of 10 parts of the t-octylthiourea of part (b) hereof and 30 parts of butyl acrylate is dissolved in 60 parts of toluene and polymerized with 1 part of azodiisobutyronitrile at 80° C. for 8 hours. The resultant viscous solution of copolymer is useful as a protective impregnant for wood, textiles and other cellulosic materials to prevent fungal deterioration.

(d) By the procedure of part (a) hereof there is condensed 29.5 parts of octadecyl isocyanate and 11.7 parts of 2-amino-1-methylethyl vinyl sulfide giving the octadecyl urea, $CH_2=CHS-CH(CH_3)CH_2NHCONHC_{18}H_{37}$ as a waxy solid. A solution of this material in benzene is applied to cotton and rayon materials and the fabrics dried at 220° C. for two minutes. The resultant materials are water-repellent.

(e) A polymer prepared by heating the monomer of part (b) hereof and 30 parts of butyl acrylate is disnitrile at 65° C. for 16 hours is useful as a textile agent to impart durable water-repellency and a soft hand to the treated fabric.

*Example 13*

(a) A solution of 24 grams of N-methylaminoethyl vinyl sulfide in 50 ml. of benzene is treated with 16.8 grams of hexamethylene diisocyanate in 50 ml. of benzene. The product precipitates as a solid in almost quantitative yield. The product is the bis-urea, $$[CH_2=CHS-CH_2CH_2N(CH_3)CONHCH_2CH_2CH_2-]_2$$

The product is useful for the preparation of copolymers. In small amounts, 0.5 to 2.0%, it is admixed with certain vinyl monomers such as formamidoethyl vinyl ether and copolymerized to give soluble copolymers of molecular weights higher than attainable with the vinyl monomers alone. Other such comonomers are ureidoethyl vinyl ether, vinyloxyethylethyleneurea, and allyl carbamate.

With other monomers, such as acrylates, methacrylates, styrene, acrylonitrile and vinyl acetate, the bis-urea in amounts from 1% to 20% of the monomer mix is useful for the production of insoluble, infusible copolymers useful for films, castings, laminates, ion-exchange beads and the like. For this application the vinyl sulfide moieties of the material of this example are particularly advantageous as compared to other divinyl compounds such as divinylbenzene, diallyl compounds or divinyl ethers in that the copolymerization ratios of vinyl sulfides with the comonomers mentioned in the preceding paragraph are high and efficient copolymerization is effected. The resultant copolymers retain ratios of monomers closely approximating those in the charge in relatively uniform distribution. Thus reproducible copolymers are readily obtained and efficient use is made of the divinyl compound. The complete utilization also imparts better stability to the resultant copolymers since there are essentially no free vinyl groups remaining. The presence of the sulfide group also imparts better thermal stability to the resulting copolymers.

(b) By the procedure of part (a) of this example, there is condensed 25 grams of methylene-bis-phenylisocyanate and 24 grams of N-methylaminoethyl vinyl sulfide. The product is a soluble solid corresponding in structure to the bis-urea,

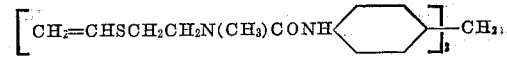

The compound is useful in the preparation of thermoset, insoluble copolymers suitable for films, castings, laminates and ion-exchange beads.

*Example 14*

(a) A mixture of 12 parts of urea and 20.6 parts of 2-aminoethyl vinyl sulfide is heated in a period of two hours from 90° C. to 120° C. During this period ammonia amounting to 0.18 mole is collected in a trap attached to the reaction flask through a condenser. The residue consists essentially of 2-ureidoethyl vinyl sulfide and may be purified by extraction with hot toluene. The product separates as a solid upon cooling the toluene extract.

(b) A mixture of 6 parts of urea and 20.6 parts of 2-aminoethyl vinyl sulfide in a flask is heated to 180° C. in a stream of nitrogen. The product purified by recrystallization is bis-2-(vinylthio)ethyleneurea, $$(CH_2=CHSCH_2CH_2NH-)_2CO$$

(c) By the procedure of part (a) hereof but substituting wholly for the urea used therein an equivalent quantity of thiourea, there is obtained as a dark red, waxy solid the corresponding thiourea, $$CH_2=CHS-CH_2CH_2NHCSNH_2$$

It is to be understood that changes and variations may be made without departing from the spirit and scope of the invention as defined in the appended claims.

I claim:

1. A composition of matter comprising a compound selected from the group consisting of those having the formulas $$CH_2=CHS\phi(NHCX)_nNR'R^2$$

$$CH_2=CHSANR^3CXNR'R^2$$

$$(CH_2=CHS\phi NHCXNH)_mR^4$$

$$(CH_2=CHSANR^3CXNH)_mR^4$$

where $\phi$ is selected from the group consisting of o-phenylene, p-phenylene and said phenylene groups substituted by 1 to 2 alkyl groups having 1 to 4 carbon atoms; X is selected from the group consisting of oxygen and sulfur, n is an integer having a value of 1 except that, when X is oxygen and both R' and R² are hydrogen, n is 2, R' and R² are selected from the group consisting of radicals directly attached only to the adjoining N atom and radicals which together and with the adjoining N atom form a heterocyclic nucleus selected from the group consisting of morpholino, piperidino, and pyrrolidino, R', when directly attached only to the adjoining N atom, is selected from the group consisting of hydrogen, phenyl, and alkyl groups having from 1 to 18 carbon atoms, R², when directly attached only to the adjoining N atom, is selected from the group consisting of hydrogen, methyl, and ethyl, A is an alkylene group having 2 to 6 carbon atoms, at least two of which extend in a chain between the adjoining S and N atoms, R³ is selected from the group consisting of hydrogen and alkyl groups having 1 to 4 carbon atoms, R⁴ is selected from the group consisting of phenylene, methylene-bis-phenylene, methylidyne-tris-phenylene, and alkylene groups having 4 to 10 carbon atoms, and $m$ is an integer having a value of 2 to 3.

2. A composition of matter comprising a polymer of a compound of claim 1.

3. A composition of matter comprising 2-ureidoethyl vinyl sulfide.

4. A composition of matter comprising N-methyl-N-2-(vinylthio)ethylurea.

5. A composition of matter comprising N-ethyl-N'-methyl-N'-2-(vinylthio)ethylurea.

6. A composition of matter comprising a polymer of N-ethyl-N'-methyl-N'-2-(vinylthio)ethylurea.

7. A composition of matter comprising a copolymer of N-ethyl-N'-methyl-N'-2-(vinylthio)ethylurea with methyl methacrylate.

8. A composition of matter comprising a copolymer of N-ethyl-N'-methyl-N'-2-(vinylthio)ethylurea with acrylonitrile.

9. A composition of matter comprising 2-(vinylthio)-phenylbiuret.

10. A composition of matter comprising N-ethyl-N'-2-(vinylthio)phenylurea.

11. A composition of matter comprising a compound of the formula $$CH_2=CHSANHCONH_2$$

where A is an alkylene group having 2 to 6 carbon atoms, at least two of which extend in a chain between the adjoining S and N atoms.

12. A composition of matter comprising a compound of the formula $$CH_2=CHSANR^3CONH_2$$

where A is an alkylene group having 2 to 6 carbon atoms, at least two of which extend in a chain between the adjoining S and N atoms, and $R^3$ is an alkyl group having 1 to 4 carbon atoms.

13. A composition of matter comprising a compound of the formula $$CH_2=CHSANR^3CONHR'$$

where A is an an alkylene group having 2 to 6 carbon atoms, at least two of which extend in a chain between the adjoining S and N atoms, $R^3$ is an alkyl group having 1 to 4 carbon atoms, and R' is an alkyl group having 1 to 18 carbon atoms.

14. A composition of matter comprising a polymer of a compound of the formula $$CH_2=CHSANR^3CONHR'$$

where A is an alkylene group having 2 to 6 carbon atoms, at least two of which extend in a chain between the adjoining S and N atoms, $R^3$ is an alkyl group having 1 to 4 carbon atoms, and R' is an alkyl group having 1 to 18 carbon atoms.

15. A method comprising the steps of reacting, in an inert solvent at a temperature between about 0° and 40° C., a compound of the formula R'NCX with a compound selected from the group consisting of those having the formulas $$CH_2=CHS\phi NH_2 \text{ and } CH_2=CHSANHR^3$$

where R' is selected from the group consisting of phenyl and alkyl groups having 1 to 18 carbon atoms, $\phi$ is selected from the group consisting of o-phenylene, p-phenylene and said phenylene groups substituted by 1 to 2 alkyl groups having 1 to 4 carbon atoms, X is selected from the group consisting of oxygen and sulfur, A is an alkylene group having 2 to 6 carbon atoms, at least two of which extend in a chain between the adjoining S and N atoms, and $R^3$ is selected from the group consisting of hydrogen and alkyl groups having 1 to 4 carbon atoms, and recovering a compound selected from the group consisting of those having the formulas $$CH_2=CHS\phi NHCXNHR'$$

and $$CH_2=CHSANR^3CXNHR'$$

16. A method comprising the steps of reacting, at a temperature between about 0° and 80° C., a compound of the formula $R'R^2NCXY'$ with a compound selected from the group consisting of those having the formulas $$CH_2=CHS\phi NH_2 \text{ and } CH_2=CHSANHR^3$$

where $\phi$ is selected from the group consisting of o-phenylene, p-phenylene and said phenylene groups substituted by 1 to 2 alkyl groups having 1 to 4 carbon atoms, X is selected from the group consisting of oxygen and sulfur, R' and $R^2$ are selected from the group consisting of radicals directly attached only to the adjoining N atom and radicals which together and with the adjoining N atom form a heterocyclic nucleus selected from the group consisting of morpholino, piperidino, and pyrrolidino, R', when directly attached only to the adjoining N atom, is selected from the group consisting of phenyl and alkyl groups having from 1 to 18 carbon atoms, $R^2$, when directly attached only to the adjoining N atom, is selected from the group consisting of methyl and ethyl, A is an alkylene group having 2 to 6 carbon atoms, at least two of which extend in a chain between the adjoining S and N atoms, $R^3$ is selected from the group consisting of hydrogen and alkyl groups having 1 to 4 carbon atoms, and Y' is a halogen atom, and recovering a compound selected from the group consisting of those having the formulas $$CH_2=CHS\phi NHCXNR'R^2$$

and $$CH_2=CHSANR^3CXNR'R^2$$

17. A method comprising the steps of reacting, in an inert solvent at a temperature between about 0° and 40° C., a compound of the formula $R^4(NCX)_m$ with a compound selected from the group consisting of those having the formulas $$CH_2=CHS\phi NH_2 \text{ and } CH_2=CHSANHR^3$$

where $\phi$ is selected from the group consisting of o-phenylene, p-phenylene and said phenylene groups substituted by 1 to 2 alkyl groups having 1 to 4 carbon atoms, X is selected from the group consisting of oxygen and sulfur, A is an alkylene group having 2 to 6 carbon atoms, at least two of which extend in a chain between the adjoining S and N atoms, $R^3$ is selected from the group consisting of hydrogen and alkyl groups having 1 to 4 carbon atoms, $R^4$ is selected from the group consisting of phenylene, methylene-bis-phenylene, methylidyne-tris-phenylene, and alkylene groups having 4 to 10 carbon atoms, and $m$ is an integer having a value of 2 to 3, and recovering a compound selected from the group consisting of those having the formulas $$(CH_2=CHS\phi NHCXNH)_m R^4$$

and $$(CH_2=CHSANR^3CXNH)_m R^4$$

18. A method comprising the steps of reacting at a temperature between about 0° and 50° C. in a solvent medium selected from the group consisting of aqueous media and anhydrous organic solvent media, in approximately equimolar proportions, an alkali metal cyanate with a mineral acid and a compound of the formula $CH_2=CHS\phi NH_2$, where $\phi$ is selected from the group consisting of o-phenylene, p-phenylene and said phenylene groups substituted by 1 to 2 alkyl groups having 1 to 4 carbon atoms, and recovering a compound of the formula $$CH_2=CHS\phi NHCONHCONH_2$$

19. A method comprising the steps of reacting, at a temperature between about 0° and 50° C. in a solvent medium selected from the group consisting of aqueous media and anhydrous organic solvent media, in approximately equimolar proportions, a mineral acid with (1) an alkali metal cyanate and (2) a compound of the formula $CH_2=CHSANHR^3$, where A is an alkylene group having 2 to 6 carbon atoms, at least two of which extend in a chain between the adjoining S and N atoms, and $R^3$ is selected from the group consisting of hydrogen and alkyl groups having 1 to 4 carbon atoms, and recovering a compound of the formula $CH_2=CHSANR^3CONH_2$.

20. A method which comprises fusing, at a temperature of 90° C. to 180° C., a compound selected from the group consisting of urea and thiourea with a compound of the formula $CH_2=CHSANHR^3$, where A is an alkylene group having 2 to 6 carbon atoms, at least two of which extend in a chain between the adjoining S and N atoms, and $R^3$ is selected from the group consisting of hydrogen and alkyl groups having 1 to 4 carbon atoms, to produce a compound of the formula $$CH_2=CHSANR^3CXNH_2$$

wherein X is selected from the group consisting of oxygen and sulfur.

No references cited.